US010205718B1

United States Patent
Chang et al.

(10) Patent No.: US 10,205,718 B1
(45) Date of Patent: Feb. 12, 2019

(54) AUTHENTICATION TRANSFER ACROSS ELECTRONIC DEVICES

(71) Applicant: INTUIT INC., Mountain View, CA (US)

(72) Inventors: Tony Chang, Mountain View, CA (US); Nathan R. Kane, Oakland, CA (US); Morgan DeBaun, San Francisco, CA (US); Brendan D. McDonald, San Francisco, CA (US)

(73) Assignee: Intuit Inc., Mountain View, CA (US)

( * ) Notice: Subject to any disclaimer, the term of this patent is extended or adjusted under 35 U.S.C. 154(b) by 127 days.

(21) Appl. No.: 14/487,977

(22) Filed: Sep. 16, 2014

(51) Int. Cl.
*H04L 29/06* (2006.01)
*G06F 21/41* (2013.01)

(52) U.S. Cl.
CPC .......... *H04L 63/0815* (2013.01); *G06F 21/41* (2013.01); *H04L 63/083* (2013.01)

(58) Field of Classification Search
CPC ... H04L 63/0853; H04L 63/083; G06F 21/31; G06F 21/32; G06F 21/41
See application file for complete search history.

(56) References Cited

U.S. PATENT DOCUMENTS

| | | | | |
|---|---|---|---|---|
| 8,868,902 B1* | 10/2014 | Brown | ........ | G06Q 20/322 713/155 |
| 2007/0139370 A1* | 6/2007 | Lu | ........ | G06F 3/011 345/156 |
| 2008/0091688 A1* | 4/2008 | Yun | ........ | G06F 17/30289 |
| 2011/0055277 A1* | 3/2011 | Resch | ........ | G06F 11/1004 707/785 |
| 2011/0295502 A1* | 12/2011 | Faenger | ........ | H04M 1/7253 701/431 |
| 2011/0296508 A1* | 12/2011 | Os | ........ | G06F 21/445 726/7 |
| 2012/0096277 A1* | 4/2012 | Perez Soria | ........ | G06Q 20/3274 713/179 |
| 2012/0198353 A1* | 8/2012 | Lee | ........ | G06F 3/017 715/748 |
| 2012/0239936 A1* | 9/2012 | Holtmanns | ........ | H04L 9/3213 713/176 |
| 2012/0259591 A1* | 10/2012 | Chang | ........ | G06F 11/2221 702/189 |

(Continued)

OTHER PUBLICATIONS

R.J. Hulsebosch et al., Context Sensitive Access Control, Jun. 1-3, 2005, ACM, pp. 111-119.*

(Continued)

*Primary Examiner* — Kari L Schmidt
*Assistant Examiner* — Fahimeh Mohammadi
(74) *Attorney, Agent, or Firm* — Patterson + Sheridan LLP (57) ABSTRACT

The disclosed embodiments provide a system that authenticates a user. During operation, the system obtains a request to transfer an authentication of the user on a first electronic device to a second electronic device. Next, the system enables, in response to the request, an authentication mechanism for transferring the authentication of the user from the first electronic device to the second electronic device. Upon detecting use of the authentication mechanism on the first electronic device or the second electronic device, the system authenticates the user on the second electronic device without requiring authentication credentials for the user from the second electronic device.

11 Claims, 4 Drawing Sheets

(56) References Cited

U.S. PATENT DOCUMENTS

| | | | | |
|---|---|---|---|---|
| 2013/0061305 A1* | 3/2013 | Bruso | ................... | G06F 21/34 |
| | | | | 726/7 |
| 2013/0111550 A1* | 5/2013 | Naveh | .................... | G06F 9/468 |
| | | | | 726/3 |
| 2013/0237155 A1* | 9/2013 | Kim | ...................... | H04W 12/06 |
| | | | | 455/41.2 |
| 2014/0049417 A1* | 2/2014 | Abdurrahman | ........ | G08C 19/00 |
| | | | | 341/176 |
| 2014/0068736 A1* | 3/2014 | Agerstam | ............. | H04W 12/06 |
| | | | | 726/7 |
| 2014/0237250 A1* | 8/2014 | Menezes | ............... | H04L 9/3213 |
| | | | | 713/172 |
| 2014/0282877 A1* | 9/2014 | Mahaffey | ............ | H04L 63/0853 |
| | | | | 726/3 |
| 2014/0306863 A1* | 10/2014 | Moy | ..................... | G06F 3/1423 |
| | | | | 345/1.3 |

OTHER PUBLICATIONS

Andre Kalamandeen et al., Ensemble: Cooperative Proximity-based Authentication, Jun. 15-18, 2010, ACM, pp. 331-344.*

Christian Kray et al., User-Defined Gestures for Connecting Mobile Phones, Public Displays, and Tabletops, Sep. 7-10, 2010, ACM, pp. 239-248.*

Jaime Ruiz et al., User-Defined Motion Gestures for Mobile Interaction, May 7-12, 2011, ACM, pp. 197-206.*

* cited by examiner

AUTHENTICATION TRANSFER ACROSS ELECTRONIC DEVICES

BACKGROUND

Related Art

The disclosed embodiments relate to techniques for performing user authentication. More specifically, the disclosed embodiments relate to techniques for performing authentication transfer across electronic devices.

User accounts and/or resources are commonly accessed through a computing device with network connectivity. For example, a user may use a laptop computer to access data and features provided by a natively installed and/or web-based accounting application. Furthermore, access to a user account and the associated resources is typically only granted after valid authentication credentials are provided by the user. For example, the user may be required to input a valid login and password to an accounting application before the user is allowed to access the feature and/or data associated with the login and password. Because such authentication credentials may be used to both identify the user and prevent unauthorized access to the user account, knowledge of the authentication credentials should be restricted to authorized users of the user account.

Multiple electronic devices, applications, and/or services may also be used to access features, data, and/or other resources associated with the same user account and/or user identity. For example, a web application on a personal computer and a mobile application on a tablet computer may use the same backend identity-management system to authenticate a user and/or track the user's identity. As a result, the user may establish the same identity with both applications on both devices, even if the user is not aware that both applications are part of the same identity-management system.

On the other hand, a user may be required to authenticate individually on each electronic device to establish his/her identity with the same identity-management system. Continuing with the above example, the user may remain logged in to the mobile application on the tablet computer after the user provides a valid login and password to the mobile application (e.g., right after the mobile application is installed). Conversely, the user may be required to provide his/her authentication credentials to the web application from the personal computer whenever the user does not have an active user session with the web application on the personal computer, even when the user continues to be logged in to the same user account on the tablet computer. Such repeated authentication of the same user with the same identity-management system may be both redundant (e.g., in requiring the user to establish the same identity from multiple electronic devices) and cumbersome (e.g., if the user forgets his/her login credentials and has to perform a password recovery on one electronic device when the user is logged in to another electronic device).

Consequently, user access to user accounts and the associated resources from multiple electronic devices may be facilitated by mechanisms for streamlining the authentication of users across the electronic devices.

SUMMARY

Many users have multiple user accounts with various devices, applications, or websites. Because the user accounts may be associated with different usernames and/or passwords, a user may easily forget the username and/or password for a given user account. As a result, the user may have trouble logging into one or more user accounts, particularly if the user has to log in from multiple electronic devices. To reduce the difficulty of logging into multiple user accounts and/or from multiple electronic devices, a user's authentication (e.g., logged-in state) on a first electronic device may be transferred to a second electronic device without requiring the user to provide his/her username and password to the second electronic device.

To enable such authentication transfer across two electronic devices, an authentication mechanism may be provided that allows the user to demonstrate possession of both electronic devices. Prior to enabling the authentication mechanism, evidence of the user's possession of both electronic devices may be obtained by verifying the proximity of the electronic devices to one another. For example, the closeness of one electronic device to the other may be verified using a geolocation technique, a wireless network, a sensor, and/or a near-field communication (NFC) mechanism on one or both electronic devices.

Information about (e.g., instructions for) using the authentication mechanism may then be provided to one or both electronic devices. For example, the user may be shown a passcode, image, and/or other token on one electronic device and instructed to transfer the token to the other electronic device by, for example, inputting the same passcode and/or using a camera to capture the image on the other electronic device. Once the authentication mechanism is used on one or both electronic devices, the user may be authenticated on the second electronic device.

The disclosed embodiments provide a system that authenticates a user. During operation, the system obtains a request to transfer an authentication of the user on a first electronic device to a second electronic device. Next, the system enables, in response to the request, an authentication mechanism for transferring the authentication of the user from the first electronic device to the second electronic device. Upon detecting use of the authentication mechanism on the first electronic device or the second electronic device, the system authenticates the user on the second electronic device without requiring authentication credentials for the user from the second electronic device.

In some embodiments, the system also verifies a proximity of the second electronic device to the first electronic device prior to enabling the authentication mechanism.

In some embodiments, the proximity of the second electronic device to the first electronic device is verified using at least one of a geolocation technique, a wireless network, a sensor, and a near-field communication (NFC) mechanism.

In some embodiments, prior to enabling the authentication mechanism, the system verifies the authentication of the user on the first electronic device and/or an approval from the user to transfer the authentication from the first electronic device.

In some embodiments, enabling the authentication mechanism includes providing information about using the authentication mechanism to the first electronic device or the second electronic device.

In some embodiments, the request includes an identifier for the user.

In some embodiments, the authentication mechanism includes transferring a token between the first and second electronic devices.

In some embodiments, the token includes at least one of a passcode and an image.

In some embodiments, the authentication mechanism includes a user action on the first electronic device or the second electronic device.

In some embodiments, the authentication of the user on the second electronic device is associated with an access level of the user on the first electronic device.

In some embodiments, the user is authenticated with a first service on the first electronic device and a second service on the second electronic device.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The disclosed embodiments provide a method and system for authenticating a user. More specifically, the disclosed embodiments provide a method and system for transferring the authentication of a user from a first electronic device to a second electronic device. For example, a logged-in state of the user with a mobile application on a mobile device may be transferred to a web application on a laptop computer without requiring the user to provide authentication credentials to the web application on the laptop computer.

To enable such authentication transfer across two electronic devices, an authentication mechanism may be provided that allows the user to demonstrate possession of both electronic devices. Prior to enabling the authentication mechanism, evidence of the user's possession of both electronic devices may be obtained by verifying the proximity of the electronic devices to one another. For example, the closeness of one electronic device to the other may be verified using a geolocation technique, a wireless network, a sensor, and/or a near-field communication (NFC) mechanism on one or both electronic devices.

Information about (e.g., instructions for) using the authentication mechanism may be then provided to one or both electronic devices. For example, the user may be shown a passcode, image, and/or other token on one electronic device and instructed to transfer the token to the other electronic device by, for example, inputting the same passcode and/or using a camera to capture the image on the other electronic device. Once the authentication mechanism is used on one or both electronic devices, the user may be authenticated on the second electronic device.

Figure 1:
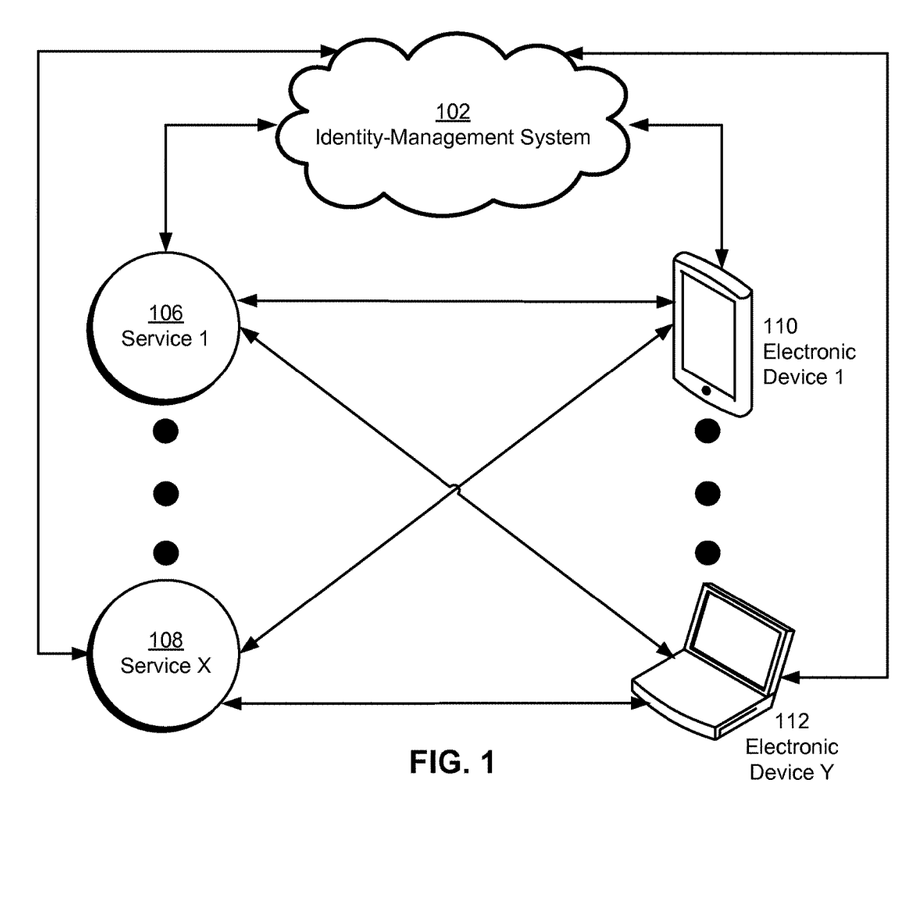
FIG. 1 shows a schematic of a system in accordance with the disclosed embodiments.

FIG. 1 shows a schematic of a system in accordance with the disclosed embodiments. As shown in FIG. 1, a set of electronic devices (e.g., electronic device 1 110, electronic device y 112) may be used to access a set of services (e.g., service 1 106, service x 108). For example, a user may use a personal computer, laptop computer, tablet computer, workstation, mobile phone, portable media player, and/or other network-enabled electronic device to use one or more native applications, web applications, operating systems, mobile applications, and/or other applications or services on the network-enabled electronic device.

The services may provide a set of resources, such as data and/or one or more features for accessing, storing, and/or manipulating the data, to the authorized users. For example, the services may include an accounting application that allows the user to store financial data from bills, invoices, receipts, tax forms, statements, financial accounts, and/or financial documents. The accounting application may also allow the user to perform tasks related to the financial data, such as generating payrolls, tracking inventory, managing invoices, tracking financial transactions, and/or generating reports. The services may also include a tax-preparation application that obtains tax forms and/or other tax-related data from the user and uses the data to prepare and file income taxes for the user.

Moreover, access to multiple services and/or the associated resources by the user may be managed by a single identity-management system 102. Identity-management system 102 may provide a common backend through which the user's identity is verified before the user is granted access to a given service (e.g., service 1 106, service x 108) from a particular electronic device (e.g., electronic device 1 110, electronic device y 112). For example, the user may provide a username and password, biometric identifier, personal identification number (PIN), certificate, and/or other authentication credentials to identity-management system 102 prior to retrieving financial account information and/or accessing financial or accounting features associated with the authentication credentials on an accounting application that uses identity-management system 102.

Those skilled in the art will appreciate that the user may be required to individually authenticate with identity-management system 102 from each electronic device, even if the user's identity has been established in a previous authentication of the user on a different electronic device. For example, the user may remain logged in to a mobile application on a mobile device after installing the mobile application on the mobile device and providing valid authentication credentials to the mobile application. On the other hand, the user may be required to re-enter the same authentication credentials to log in to a web application on a computer system, even if the web application and the mobile application both use identity-management system 102 to verify the same identity of the user.

In addition, such repeated verification of the user's identity may be inconvenient and/or cumbersome to the user. For example, authentication of the user on each electronic device may delay the user's access to services on the electronic device. The user may even be barred from accessing the services if the user forgets his/her authentication credentials. In turn, the user may be required to undergo a lengthy password recovery process with identity-management system 102 to re-establish his/her identity with identity-management system 102 and/or reset his/her authentication credentials.

In one or more embodiments, identity-management system 102 includes functionality to transfer the authentication of the user from a first electronic device to a second electronic device. To mitigate security risks associated with such authentication transfer, identity-management system 102 may first verify that the user is already authenticated with the first electronic device, has possession of both electronic devices, and/or has approved authentication transfer from the first electronic device. Identity-management system 102 may then enable an authentication mechanism that allows the user to transfer his/her authentication from the first electronic device to the second electronic device without requiring authentication credentials for the user from the second electronic device, as discussed in further detail below.

Figure 2:
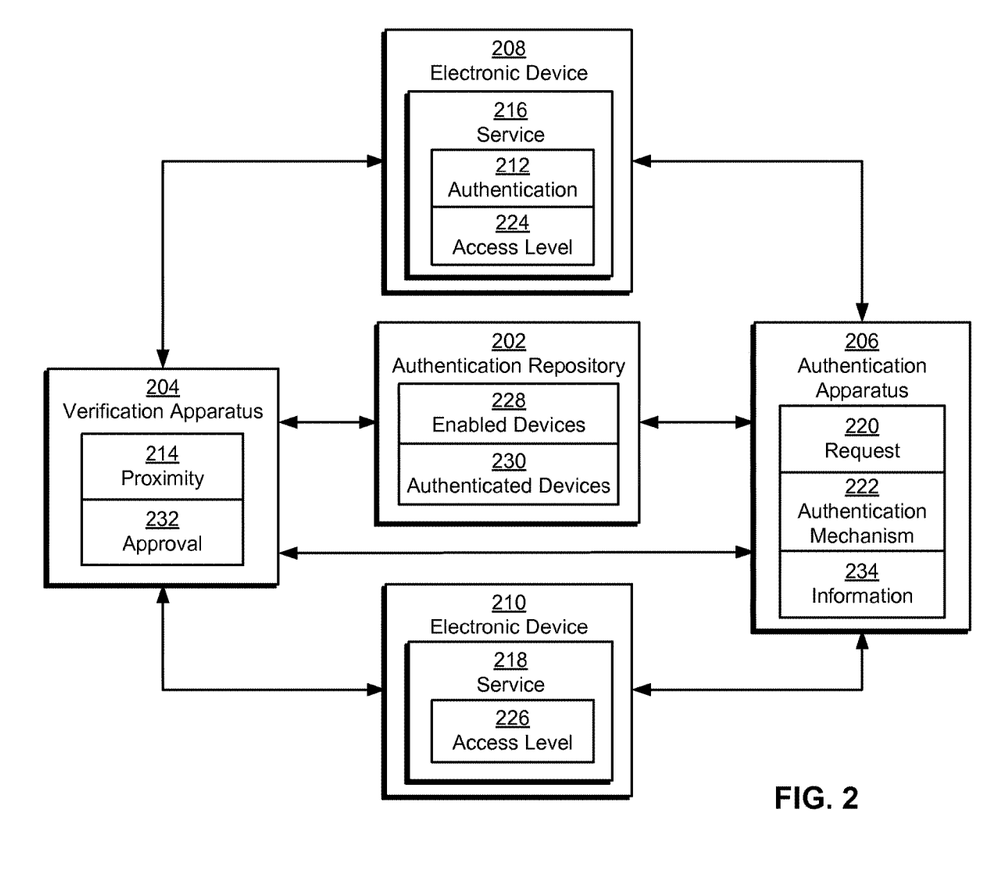
FIG. 2 shows a system for authenticating a user in accordance with the disclosed embodiments.

FIG. 2 shows a system for authenticating a user in accordance with the disclosed embodiments. More specifically, FIG. 2 shows an identity-management system (e.g., identity-management system 102 of FIG. 1) that enables the transfer of a user's authentication 212 on a first electronic device 204 to a second electronic device 206. As shown in FIG. 2, the identity-management system includes an authentication repository 202, a verification apparatus 204, and an authentication apparatus 206. Each of these components is described in further detail below.

As mentioned above, electronic devices 208-210 may be used to access one or more services 216-218 associated with the identity-management system. Services 216-218 may be provided by operating systems, native applications, web applications, and/or other types of applications on electronic devices 208-210 such as personal computers, laptop computers, tablet computers, mobile phones, personal digital assistants, and/or portable media players.

Services 216-218 may be used to access the same or different sets of resources. For example, services 216-218 may include a web application and a mobile application for accessing the same financial-management service, or services 216-218 may include a tax-preparation application and an accounting application that use the same identity-management system to establish the user's identity before enabling access to tax-preparation resources and accounting resources, respectively.

Prior to accessing services 216-218 and the associated resources, authentication apparatus 206, verification apparatus 204, and/or another component of the identity-management system may verify the user's identity and/or access rights to the services and resources on electronic devices 208-210 from which the user intends to access services 216-218. For example, authentication apparatus 206 may authenticate the user on electronic device 208 by obtaining a valid login and password from the user. After the user is authenticated on electronic device 208, authentication apparatus 206 may track the user's authentication 212 on electronic device 208 by adding the identifier for electronic device 208 to a list of authenticated devices 230 in authentication repository 202.

In addition, services 216-218 may maintain authentication 212 of the user for different periods. For example, a mobile application may keep the user logged in for an indefinite period after receiving valid authentication credentials for the user, while a web application for accessing the same user account may require the user to re-authenticate after the user has been inactive for a pre-specified period (e.g., a number of minutes). As a result, the user may easily forget his/her authentication credentials if the user primarily uses the mobile application, which in turn may prevent the user from easily logging in to the web application (e.g. to access a feature not available on the mobile application).

To facilitate access to services 216-218 across electronic devices 208-210, authentication apparatus 206 may provide an authentication mechanism 222 that allows the user to transfer authentication 212 from electronic device 208 to electronic device 210. Authentication mechanism 222 may be enabled after authentication apparatus 206 receives a request 220 from one or both electronic devices 208-210 to transfer authentication 212 between electronic devices 208-210. For example, the user may submit request 220 through an authentication screen on electronic device 210, or the user may make request 220 by accessing a feature and/or user-interface element on electronic device 208.

Before authentication mechanism 222 is enabled by authentication apparatus 206, verification apparatus 204 may perform a number of verifications to reduce the security risk associated with transferring authentication 212 between electronic devices 208-210. First, verification apparatus 204 may verify authentication 212 of the user on electronic device 208 by searching the list of authenticated devices 230 in authentication repository 202 for the identifier representing electronic device 208. Alternatively, verification apparatus 204 may verify authentication 212 by obtaining an access token and/or other verification of authentication 212 from electronic device 208 and/or authentication apparatus 206.

Second, verification apparatus 204 may verify a proximity 214 of electronic devices 208-210 to one another. Proximity 214 may reduce security vulnerabilities associated with transfer of authentication 212 across electronic devices 208-210 by increasing the likelihood that the user is in possession of both electronic devices 208-210 at the time of request 220. For example, proximity 214 may reduce the ability of an attacker who does not have possession of electronic device 208 to authenticate as the user on a stolen electronic device 210.

To detect proximity 214, verification apparatus 204 may use a geolocation technique that utilizes Global Positioning System (GPS) receivers, cellular network triangulation, and/or WiFi positioning to determine the geographic locations of electronic devices 208-210. Verification apparatus 204 may then compare the geographic locations of electronic devices 208-210 to determine if electronic devices 208-210 are close enough to be in proximity 214 to one another (e.g., within a certain number of feet of one another).

Verification apparatus 204 may also determine proximity 214 using the relative positions and/or distances of electronic devices 208-210, in lieu of or in addition to the geographic locations of electronic devices 208-210 provided by the geolocation technique. For example, verification apparatus 204 may determine proximity 214 based on the connection of both electronic devices 208-210 to the same wireless (e.g., WiFi) network and/or cellular tower. Similarly, verification apparatus 204 may establish proximity 214 using short-distance communications mechanisms supported by electronic devices 208-210, such as Bluetooth (Bluetooth™ is a registered trademark of Bluetooth SIG, Inc.) and/or near field communication (NFC). Finally, verification apparatus 204 may use sensors and/or input/output (I/O) devices such as accelerometers, cameras, microphones, speakers, and/or displays on electronic devices 208-210 to generate and/or detect signals (e.g., images, sound, motion, etc.) that indicate that electronic devices 208-210 are within close range of one another.

Third, verification apparatus 204 may verify approval 232 from the user to transfer authentication 212 from electronic device 208 to another electronic device (e.g., electronic device 210). Such approval 232 may be provided through a setting on service 216 and/or other services on electronic device 208 that use the same identity-management system.

In addition, the setting may be disabled by default, and the user may undergo an activation process on electronic device 208 to enable the setting. For example, the activation process may require that the user be already authenticated with electronic device 208 before the user can enable the setting. Moreover, because enabling the setting may constitute a security risk, the user may also be required to perform two-factor authentication, answer one or more security questions, and/or otherwise provide stronger authentication credentials with the identity-management system before the setting is enabled. Once the setting is enabled, authentication apparatus 206, verification apparatus 204, and/or another component of the identity-management system may add electronic device 208 to a list of enabled devices 228 in authentication repository 202.

As a result, verification apparatus 204 may verify user approval 232 to transfer authentication 212 from electronic device 208 by searching the list of enabled devices 228 in authentication repository 202 for an identifier for electronic device 208. Conversely, verification apparatus 204 may obtain a one-time approval 232 to transfer authentication 212 from electronic device 208 by querying the user for approval 232 through service 216 and/or obtaining additional authentication factors or credentials representing approval 232 from the user.

After authentication 212, proximity 214, and approval 232 are verified, authentication apparatus 206 may enable authentication mechanism 222, and the user may use authentication mechanism 222 on one or both electronic devices 208-210 to transfer authentication 212 from electronic device 208 to electronic device 210. To facilitate use of authentication mechanism 222, authentication apparatus 206 may provide information 234 about using authentication mechanism 222 to one or both electronic devices 208-210 (e.g., through one or both services 216-218).

In one or more embodiments, authentication mechanism 222 is used to further verify the user's possession of and/or ability to access both electronic devices 208-210. First, authentication mechanism 222 may include the transfer of a token, such as a passcode, image, or other data element, between electronic devices 208-210. To enable use of authentication mechanism 222 by the user, authentication apparatus 206 may display and/or otherwise provide the token on one electronic device and instruct the user (e.g., using instructions displayed on one or both electronic devices) to copy the token to the other electronic device.

For example, authentication apparatus 206 may push a passcode representing authentication mechanism 222 to service 216. Service 216 may display the passcode to the user, along with instructions to the user to type the passcode into electronic device 210. In turn, the user may use authentication mechanism 222 by inputting the passcode displayed on electronic device 208 into a user-interface element (e.g., text box) on electronic device 210. In another example, authentication apparatus 206 may provide a barcode representing authentication mechanism 222 to service 218, and service 218 may display the barcode and instruct the user to capture an image of the barcode using a camera on electronic device 208. In other words, the user may use authentication mechanism 222 by capturing an image of a barcode displayed on one electronic device using a camera on the other electronic device, thereby transferring information in the barcode from one electronic device to another.

Authentication mechanism 222 may also involve a user action on one or both electronic devices 208-210, in lieu of or in addition to the transfer of a token between electronic devices 208-210. For example, the user may be instructed to perform a gesture such as swiping, tracing a shape or pattern, and/or a multi-touch gesture on an electronic device with a touchscreen, mouse, and/or trackpad to transfer authentication 212 to or from the electronic device. Alternatively, if both electronic devices 208-210 have sensors such as accelerometers and/or gyroscopes, the user may trigger the transfer of authentication 212 by making similar or identical motions (e.g., shaking, rotating, tracing a shape in the air, moving along an axis, etc.) using electronic devices 208-210 at the same time and/or within a pre-specified interval.

Once authentication apparatus 206 detects use of authentication mechanism 222 on one or both electronic devices 208-210, authentication apparatus 206 may authenticate the user on electronic device 210 without requiring authentication credentials for the user from electronic device 210. In turn, the user may be granted access to resources associated with the user's identity on service 218.

Moreover, the user may be granted an access level 226 with service 218 that is equivalent to an access level 224 of the user with service 216. For example, authentication 212 may be transferred from electronic device 208 to electronic device 210 by copying an access token (e.g., an OAuth access token) for the user from service 216 to service 218. Thus, the user may have one set of access rights (e.g., read, write, etc.) that relate to all services (e.g., services 216-218) used by the user under the identity-management system. The use of the same access token on both electronic devices 208-210 may further ensure that the user's sessions with services 216-218 expire at the same time. Similarly, if the user logs out of service 216 on electronic device 208, the access token may be revoked for electronic device 210 and/or other electronic devices sharing the access token.

Consequently, the system of FIG. 2 may enable the transfer of a user's authentication 212 from a first electronic device (e.g., electronic device 208) to a second electronic device (e.g., electronic device 210) without requiring the user to re-enter authentication credentials on the second electronic device. As a result, the system may streamline user authentication across electronic devices and reduce overhead associated with managing and/or recovering authentication credentials (e.g., forgotten passwords). At the same time, the verification of the electronic devices' proximity 214 to one another and/or the use of the same access levels in transferring authentication 212 may mitigate security risks associated with enabling user authentication on an electronic device without requiring authentication credentials for the user from the electronic device.

Those skilled in the art will appreciate that the system of FIG. 2 may be implemented in a variety of ways. First, authentication repository 202, verification apparatus 204, and authentication apparatus 206 may be provided by a single physical machine, multiple computer systems, one or more virtual machines, a grid, one or more databases, one or more file systems, and/or a cloud computing system. Verification apparatus 204 and authentication apparatus 206 may additionally be implemented together and/or separately by one or more hardware and/or software components and/or layers.

Second, a number of techniques may be used to transfer authentication 212 from electronic device 208 to electronic device 210. As mentioned above, various types of tokens, user actions, sensors, and/or interactions may be used with authentication mechanism 222 to establish possession of both electronic devices 208-210 by the same user and enable the transfer of authentication 212 between electronic devices 208-210. Similarly, authentication 212 may be passed and/or transferred across electronic devices 208-210 using authentication-exchange mechanisms such as OAuth, OpenID, and/or Security Assertion Markup Language (SAML).

Figure 3:
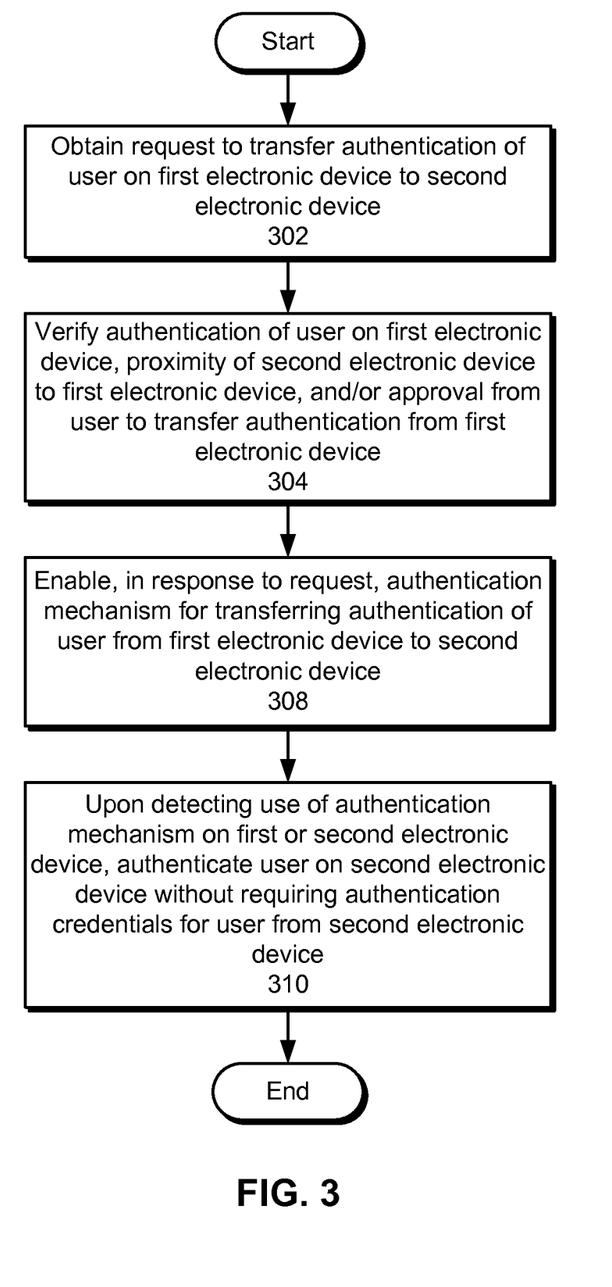
FIG. 3 shows a flowchart illustrating the process of authenticating a user in accordance with the disclosed embodiments.

FIG. 3 shows a flowchart illustrating the process of authenticating a user in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the technique.

Initially, a request to transfer an authentication of the user on a first electronic device to a second electronic device is obtained (operation 302). For example, the request may be obtained from the second electronic device and include an identifier (e.g., username, email address, etc.) for the user. The request may be made if the user does not wish to re-authenticate with the second electronic device and/or has forgotten his/her authentication credentials.

Next, the authentication of the user on the first electronic device, proximity of the second electronic device to the first electronic device, and/or approval from the user to transfer the authentication from the first electronic device are verified (operation 304). For example, the identifier for the user from the request may be matched to a list of authenticated devices for the user to identify the first electronic device and/or verify that the user is authenticated with a service on the first electronic device. The user's approval to transfer his/her authentication from the first electronic device may be obtained previously as an enabled setting on the first electronic device and/or as a one-time approval after the request is received. The proximity of the two electronic devices to one another may be verified using a geolocation technique, a wireless (e.g., WiFi, Bluetooth, cellular) network, a sensor, and/or NFC.

After the user's authentication on the first electronic device, the proximity of the electronic devices to one another, and/or the user's approval to transfer the authentication from the first electronic device are verified, an authentication mechanism for transferring the user's authentication from the first electronic device to the second electronic device is enabled in response to the request (operation 308). The authentication mechanism may include the transfer of a token (e.g., passcode, image, file, etc.) between the first and second electronic devices and/or a user action (e.g., gesture, motion, etc.) on the first electronic device and/or the second electronic device. To enable use of the authentication mechanism by the user, information about using the authentication mechanism may be provided to the first and/or second electronic devices.

Finally, upon detecting the use of the authentication mechanism on the first and/or second electronic devices, the user is authenticated on the second electronic device without requiring authentication credentials for the user from the second electronic device (operation 310). For example, an access token may be transferred from a first service on the first electronic device to a second service on the second electronic device after the user transfers a token and/or performs an action that triggers the authentication mechanism and indicates that the user has access to both electronic devices. Because the same access token is used with both electronic devices, the user may have the same access level on both electronic devices. Similarly, if the user logs out of the first electronic device, the user's authentication on the second electronic device may be revoked.

Figure 4:
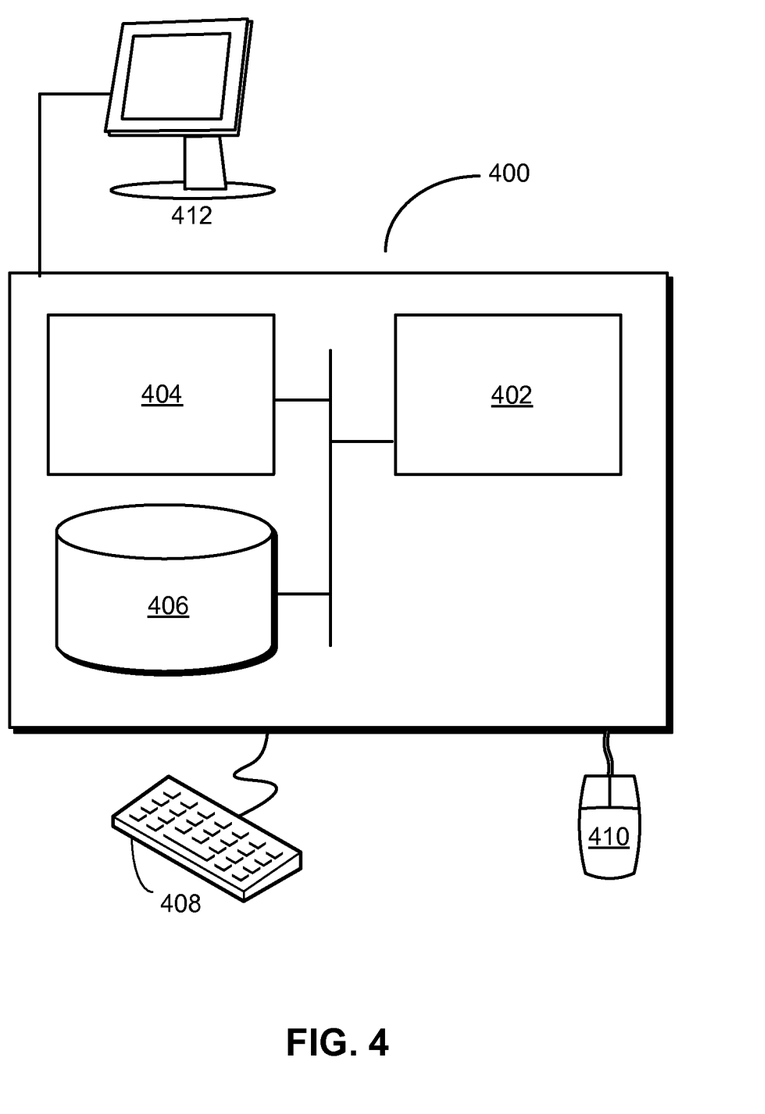
FIG. 4 shows a computer system in accordance with the disclosed embodiments.

FIG. 4 shows a computer system 400. Computer system 400 includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as a keyboard 408, a mouse 410, and a display 412.

Computer system 400 may include functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications may obtain the use of hardware resources on computer system 400 from the operating system, as well as interact with the user through a hardware and/or software framework provided by the operating system.

In particular, computer system 400 may provide a system for authenticating a user. The system may include an authentication apparatus. The authentication apparatus may obtain a request to transfer an authentication of the user on a first electronic device to a second electronic device. Next, the authentication apparatus may enable, in response to the request, an authentication mechanism for transferring the authentication of the user from the first electronic device to the second electronic device. Upon detecting use of the authentication mechanism on the first electronic device or the second electronic device, the authentication apparatus may authenticate the user on the second electronic device without requiring authentication credentials for the user from the second electronic device.

The system may also include a verification apparatus. Before the authentication mechanism is enabled, the verification apparatus may verify the proximity of the second electronic device to the first electronic device, the authentication of the user on the first electronic device, and/or an approval from the user to transfer the authentication from the first electronic device.

In addition, one or more components of computer system 400 may be remotely located and connected to the other components over a network. Portions of the present embodiments (e.g., authentication apparatus, verification apparatus, electronic devices, services, etc.) may also be located on different nodes of a distributed system that implements the embodiments. For example, the present embodiments may be implemented using a cloud computing system that enables authentication transfer among two or more remote electronic devices.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for transferring an authentication of a user performed on a first electronic device to at least a second electronic device, the method comprising:
    obtaining, via a processor, a request to transfer the authentication of the user from the first electronic device to the second electronic device;
    verifying the authentication of the user on the first electronic device by evaluating a list specifying authenticated devices associated with the user, wherein the user is authenticated with a first service on the first electronic device;
    detecting, via a sensor associated with the first electronic device, a specified physical motion to initiate a transferring of a first token comprising a passcode from the first electronic device to the second electronic device, wherein the first electronic device initiates the transferring of the first token upon determining, based on a detected signal from the second electronic device, that the second electronic device has detected the specified physical motion within a time interval; and
    upon detecting that the second electronic device has received the first token, authenticating the user on the second electronic device based on an access level of the user on the first electronic device without requiring authentication credentials for the user from the second electronic device, wherein the user is authenticated with a second service on the second electronic device.

2. The computer-implemented method of claim 1, further comprising:
    verifying a proximity of the second electronic device to the first electronic device.

3. The computer-implemented method of claim 2, wherein the proximity of the second electronic device to the first electronic device is verified using at least one of a geolocation technique, a wireless network, a sensor, and a near-field communication (NFC) mechanism.

4. The computer-implemented method of claim 1, further comprising:
    verifying an approval from the user to transfer the authentication from the first electronic device.

5. The computer-implemented method of claim 1, wherein enabling the authentication mechanism comprises:
    providing information about the specified physical motion to the first electronic device or the second electronic device.

6. The computer-implemented method of claim 1, wherein the request comprises an identifier for the user.

7. A system for transferring an authentication of a user performed on a first electronic device to at least a second electronic device, comprising:
    a verification apparatus configured to verify the authentication of the user from the first electronic device by evaluating a list specifying authenticated devices associated with the user, wherein the user is authenticated with a first service on the first electronic device; and
    an authentication apparatus configured to:
    obtain a request to transfer the authentication of the user on the first electronic device to the second electronic device;
    detect, via a sensor associated with the first electronic device, a specified physical motion to initiate a transferring of a first token comprising a passcode from the first electronic device to the second electronic device, wherein the first electronic device initiates the transferring of the first token upon determining, based on a detected signal from the second electronic device, that the second electronic device has detected the specified physical motion within a time interval; and
    upon detecting that the second electronic device has received the first token, authenticate the user on the second electronic device based on an access level of the user on the first electronic device without requiring authentication credentials for the user from the second electronic device, wherein the user is authenticated with a second service on the second electronic device.

8. The system of claim 7, wherein the verification apparatus is further configured to:
    verify a proximity of the second electronic device to the first electronic device.

9. The system of claim 7, wherein enabling the authentication mechanism comprises:
    providing information about the specified physical motion to the first electronic device or the second electronic device.

10. A non-transitory computer-readable storage medium storing instructions that when executed by a computer cause the computer to perform a method for transferring an authentication of a user performed on a first electronic device to at least a second electronic device, the method comprising:
    obtaining, via a processor, a request to transfer the authentication of the user from the first electronic device to the second electronic device;
    verifying the authentication of the user on the first electronic device by evaluating a list specifying authenticated devices associated with the user, wherein the user is authenticated with a first service on the first electronic device;
    detecting, via a sensor associated with the first electronic device, a specified physical motion to initiate a transferring of a first token comprising a passcode from the first electronic device to the second electronic device, wherein the first electronic device initiates the transferring of the first token upon determining, based on a detected signal from the second electronic device, that the second electronic device has detected the specified physical motion within a time interval; and
    upon detecting that the second electronic device has received the first token, authenticating the user on the second electronic device based on an access level of the user on the first electronic device without requiring authentication credentials for the user from the second electronic device, wherein the user is authenticated with a second service on the second electronic device.

11. The non-transitory computer-readable storage medium of claim 10, the method further comprising:
   verifying at least one of:
   a proximity of the second electronic device to the first electronic device; and
   an approval from the user to transfer the authentication from the first electronic device.

\* \* \* \* \*